United States Patent Office

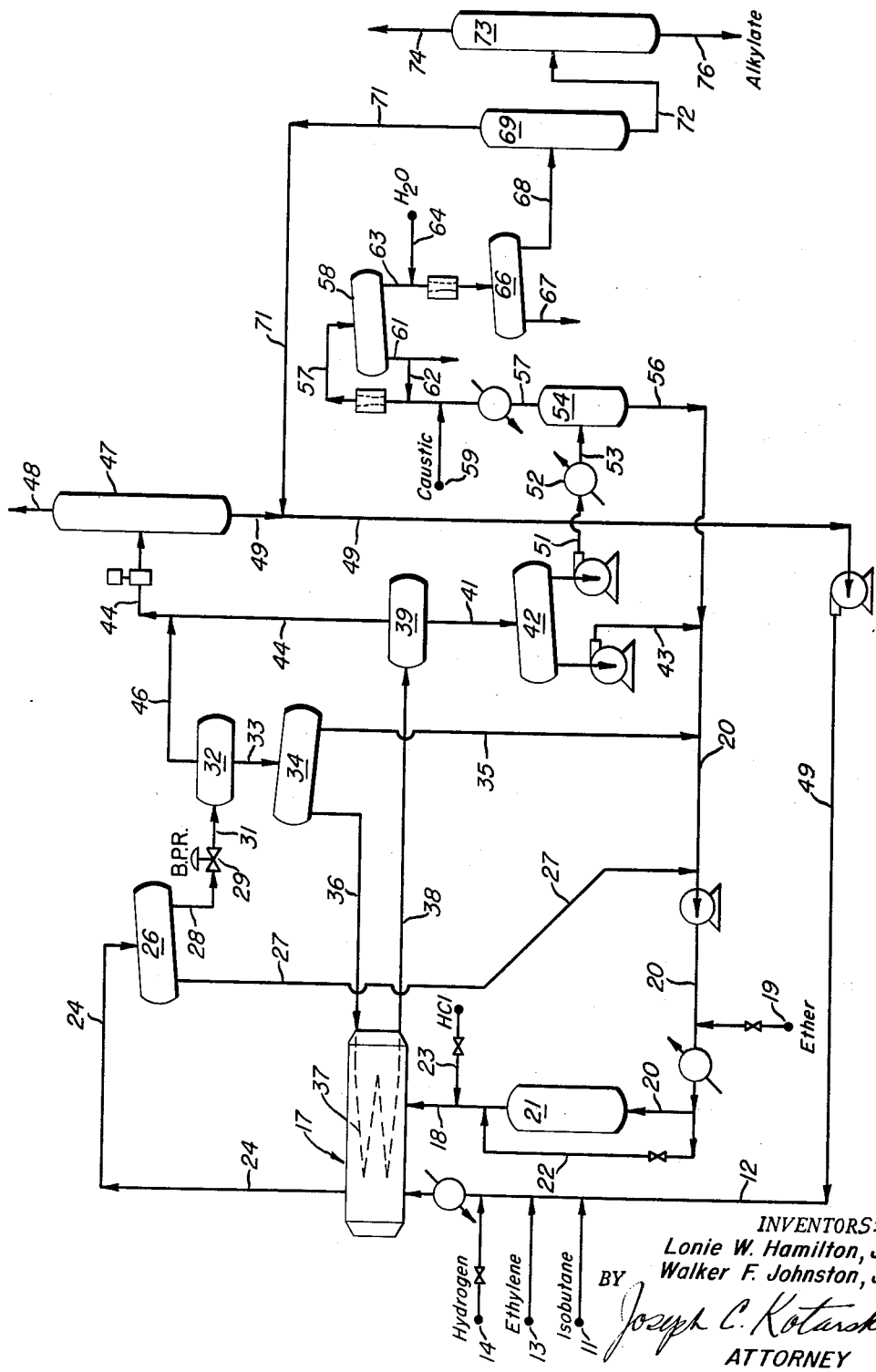

2,960,553
Patented Nov. 15, 1960

---

2,960,553

ALKYLATION PROCESS

Lonie W. Hamilton, Jr., and Walker F. Johnston, Jr., La Marque, Tex., assignors to The American Oil Company, Texas City, Tex., a corporation of Texas Filed Feb. 19, 1959, Ser. No. 794,304

4 Claims. (Cl. 260—683.53)

This invention relates to the alkylation of isoparaffins with olefins, and more particularly concerns improvements in the aluminum chloride-ether catalyzed isoparaffin-olefin alkylation reaction.

The need for higher octane blending components for motor fuel and aviation gasoline is causing petroleum refiners to look toward isoparaffin-olefin alkylate as an ever more important source of these high octane blending components. As the octane race continues, higher octane alkylates are desired. When isoparaffins are alkylated with olefins using an aluminum chloride-ether catalyst a higher octane alkylate is produced. For example, when isobutane is alkylated with ethylene the alkylate may range in octane number from 100 to 103 F–1 clear. During the reaction however, a complex of aluminum chloride with hydrocarbons forms in varying amounts. The complex forms by reaction of alkylate and other hydrocarbons with aluminum chloride from the catalyst. The loss of aluminum chloride from the aluminum chloride-ether catalyst reduces its activity and additional amounts of aluminum chloride must be incorporated in the aluminum chloride-ether catalyst to sustain the alkylation reaction, yields and octane number. Thus the formation of the aluminum chloride-hydrocarbon complex increases the catalyst cost involved in the alkylation reaction. In addition, when excessive amounts of aluminum chloride-hydrocarbon complex are present in admixture with the aluminum chloride-ether catalyst, the catalyst becomes more viscous and mixing costs increase, there is a tendency for the octane number of the alkylate to drop, and a system must therefor be provided for removing the aluminum chloride-hydrocarbon complex from the catalyst.

When aluminum chloride-hydrocarbon complex forms in undesirable amounts during the aluminum chloride-ether catalyzed alkylation of isoparaffins with olefins, e.g. the alkylation of isobutane with ethylene, the addition of hydrogen to the alkylation reaction zone is beneficial in suppressing the rate at which aluminum chloride-hydrocarbon complex forms. Suppression of the rate at which aluminum chloride-hydrocarbon complex forms also has the advantage of reducing aluminum chloride catalyst cost, alkylation mixing costs, and costs involved in separating aluminum chloride-hydrocarbon complex from the aluminum chloride-ether catalyst. The hydrogen is added to the alkylation reaction zone in amounts sufficient to repress the rate at which the aluminum chloride-hydrocarbon complex normally forms. Amounts of from .01 to 1.0 or more mols of hydrogen per mol of olefin charged may be used, e.g. .05 to .5 mols of hydrogen per mol of olefin are usually satisfactory. Even larger amounts may be used without adverse effect, but the use of such larger amounts tends to raise the operating pressure of the alkylation reaction to levels where it may be economical to consider the use of smaller amounts of hydrogen. The beneficial effects of using hydrogen are particularly emphasized when the reactants and catalyst are not anhydrous i.e. contain slight amounts of water.

A particular embodiment of this invention is illustrated in schematic form in the figure which forms a portion of this specification. Numerous pipes, valves and other details such as would be apparent to those skilled in the art have been omitted from the drawing for purpose of clarity. In the embodiment in Figure 1 hydrogen is added during the aluminum chloride-ether catalyzed alkylation of isobutane with ethylene.

Referring to the figure, isobutane is introduced from an external source by way of line 11 into line 12. Ethylene from an external source is introduced by way of line 13 into line 12. Hydrogen is introduced from an external source by way of valved line 14 into line 12. Each of these streams has had the major portion of water that was contained therein removed by passage through driers (not shown herein) prior to introduction into line 12. The combined stream in line 12 is then passed through cooling means whereby its temperature is reduced to about 50° F. prior to introduction into alkylation reactor 17. An aluminum chloride-ether catalyst is introduced into alkylation reactor 17 by way of line 18.

The isobutane, ethylene, hydrogen and aluminum chloride-ether catalyst are thoroughly agitated (by means not shown herein) under alkylation reaction conditions. Alkylation temperatures at which the catalyst is liquid are employed. The temperature should be below about 150–200° F. and is generally in the range of 25–100° F., suitably about 40–70° F. A pressure sufficient to maintain isobutane and ethylene in the liquid phase is employed. For example, pressures in the range of 25 to 1,000 p.s.i.g. may be used, suitably about 50 to 300 p.s.i.g. The customary paraffin/olefin ratios that are used in commercial alkylation processes are suitable. In the alkylation process an external isoparaffin/olefin ratio from 2:1 to 50:1 may be used. An internal isoparaffin/olefin ratio of from 10:1 to 50,000:1 may be employed. The amount of catalyst introduced and maintained in the alkylation reactor is generally less than the amount of hydrocarbon reactants introduced into the reactor. However, liquid volumetric ratios of hydrocarbon reactants to catalyst of from 1:1 to 100:1 e.g. 10:1 to 30:1 can be used in the alkylation reaction. Residence time of the reactants and catalyst in the alkylation reactor may be from one minute to more than two hours, depending upon the reactor, hydrocarbon to catalyst ratios, and desired results. A residence time of from 5 to 60 minutes e.g. 10 to 20 minutes is satisfactory. Various alkylation reactors and alkylation reaction systems such as the jet type, time-tank system, Stratco type, Cascade type, etc. can be used.

The catalyst which is used consists of aluminum chloride and a low molecular weight ether. Suitable ethers generally contain less than about 8 carbon atoms per molecule, and suitably may have from 2 to 6 carbon atoms per molecule. Ethers such as dimethyl ether, diethyl ether, methyl ethyl ether, methyl propyl ether, or mixtures of aliphatic type ethers may be used. The alkylation catalyst may be made by mixing anhydrous aluminum chloride (preferably of high purity) with the ether at a temperature below 180–200° F. e.g. temperatures of 80–140° F. are satisfactory. The catalyst in its very active form contains in excess of 1 mol of aluminum chloride per mol of ether. It may contain as much as 2 or more mols of aluminum chloride per mol of ether but usually the molar ratio of aluminum chloride to ether is in the range of 1.01:1 to 1.5:1. While we do not wish to be bound by any theory, it is believed that the catalyst in its highly active form is an equimolar complex of aluminum chloride and ether containing additional amounts of aluminum chloride dissolved within the liquid complex. In this embodiment the catalyst contains about 1.2 mols of aluminum chloride per mole of ether. The catalyst, which is liquid at room temperature but tends to thicken and solidify at lower temperatures, is preferably fully saturatde with respect to aluminum chloride so that a minor amount of solid aluminum chloride particles remains suspended therein when the liquid catalyst is used during the alkylation reaction.

As was indicated earlier heerin, a complex of aluminum chloride with hydrocarbons begins forming after the alkylation process has been on stream for a while. It appears to be formed by reaction of hydrocarbons such as alkylate with the aluminum chloride contained in the aluminum chloride-ether catalyst. The aluminum chloride-hydrocarbon complex contains in the range of 50–75% by weight of aluminum chloride, the remainder being a highly unsaturated oil. When it is hydrolyzed, a polyolefinic oil commonly termed "red oil" is sprung. The aluminum chloride-hydrocarbon complex is miscible with and soluble in the aluminum chloride-ether catalyst. It is more viscous than the catalyst and this increases mixing power requirements for the alkylation reactor. Its presence in the catalyst tends to reduce the catalyst activity. Since the catalyst is separated by decantation from the alkylate and catalyst is recycled to the reactor, it is apparent that the concentration of aluminum chloride-hydrocarbon complex in the catalyst (aluminum chloride-ether) builds up the longer the catalyst is used. By adding hydrogen to the alkylation reactor, the formation of the aluminum chloride-hydrocarbon complex is suppressed. It can therefore be held at a lower level. If the aluminum chloride-hydrocarbon complex were allowed to build up to a high level on the order of 20 to 40% by weight in the catalyst, the catalyst would suffer a loss of activity which would result in reduction in yield of alkylate, and alkylate octane number would also be lower.

When adding hydrogen to the alkylation reactor to suppress aluminum chloride-hydrocarbon complex formation, it may be used in amounts of from .01 to 1.0 mol or more per mol of ethylene introduced into the alkylation reactor. This corresponds to the use of hydrogen rates of from 1 to 100 mol percent or more based on ethylene. The use of from 0.5 to .5 e.g. .1 to .25 mol per mol of ethylene is quite satisfactory. The hydrogen may be added in amounts such that the hydrogen partial pressure in the reactor is as low as 5 to 10 p.s.i.g. or as high as 1,000 p.s.i.g., e.g. around 50 p.s.i.g. Even though precautions are taken to use very dry aluminum chloride and ether in the preparation of the catalyst and even though driers are employed to dry the hydrocarbon reactants to the alkylation reaction, slight amounts of water may be present during the alkylation reaction depending upon the efficiency of the hydrocarbon drying operations and the amount of water initially present in the catalyst components. The aluminum chloride-hydrocarbon complex appears to form at a more rapid rate under non-anhydrous alkylation conditions i.e. when more than about 20 p.p.m. water is present in the hydrocarbon reactants and catalyst (anhydrous conditions being defined as less than about 10 p.p.m. water in the reactants and catalyst). It is especially advantageous therefore to employ hydrogen under non-anhydrous alkylation conditions.

An effluent stream consisting of a mixture of hydrocarbon alkylation products and catalyst is removed from alkylation reactor 17 and passed by way of line 24 to settler 26. The alkylation products, which are a liquid under pressure, contain hydrogen, unreacted isobutane and sometimes a small amount of unreacted ethylene, and isoparaffin-olefin alkylate, is separated from the heavier catalyst by stratification in settler 26. The catalyst, which is heavier than the hydrocarbons, is removed from settler 26 and passed by way of line 27 into line 20. A small amount of ether may be introduced by way of valved line 19 into line 20, to make up for any ether lost with the catalyst during the alhylation process scheme. The recycled catalyst is passed through a heater and then into catalyst saturator 21 which contains aluminum chloride particles. Although not illustrated in the drawing, two or more catalyst saturator vessels may be used, one being on stream while the other is being refilled with aluminum chloride. A valved line 22 which permits recycled catalyst to bypass the saturator may be employed to permit refilling of saturator 21 with aluminum chloride. After passage through catalyst saturator 21 (wherein more aluminum chloride is dissovled in the catalyst) the catalyst is passed by way of line 18 into the alkylation reactor. Hydrogen chloride in the amount of from .01 to .1 percent by weight, based on total hydrocarbon feed to the alkylation reactor may be introduced into the alkylation reactor e.g. by adding it to the catalyst through valved line 23.

Catalyst saturator 21 is used to introduce more aluminum chloride into the aluminum chloride-ether catalyst. Aluminum chloride is lost from the aluminum chloride-ether catalyst during the alkylation process. Some aluminum chloride is consumed by reaction with any water, hydrogen sulfide, butadiene, acetylene or other impurities present in the hydrocarbon reactants or ether. Aluminum chloride is lost from the catalyst by reaction of aluminum chloride with hydrocarbons to form an aluminum chloride-hydrocarbon complex. To sustain the alkylation reaction it is important that additional aluminum chloride be introduced into the catalyst before the catalyst is used in the alkylation reactor. If one were to add aluminum chloride directly into the alkylation reactor, many problems arise. It would require pumping a granular solid into a higher pressure zone. The granular solid would tend to cause erosion of the pumping means. As aluminum chloride comes into the reactor it would have a tendency to react with the liquid hydrocarbons therein and form aluminum chloride-hydrocarbon complex at a faster rate, inasmuch as there would be an increment of time before the aluminum chloride would pass from the hydrocarbon phase into the catalyst phase. In addition the incremental addition of aluminum chloride would cause wide variation in the catalyst activity and consequently cause a fluctuation in alkylate yield and octane number. Since all of the aluminum chloride would have to be introduced into the reactor at only a few locations, this would have the effect of incremental addition inasmuch as a finite amount of time would be needed before the aluminum chloride could be distributed rather evenly within the dispersed catalyst phase.

Aluminum chloride is soluble in the liquid aluminum chloride-ether catalyst in varying amounts, depending upon the temperature. Larger amounts become soluble as the temperature is increased. At the usual alkylation temperatures of 50–70° F. the liquid catalyst should contain a small amount of solid aluminum chloride particles to maintain high activity during the time the catalyst is in the alkylation reactor since aluminum chloride is consumed in small amounts therein by way of side reactions with water and in forming aluminum chloride-hydrocarbon complex. Pumping a liquid containing granular solids would cause serious problems in that erosion of metal from the pump and piping would occur and the eroded metal would contaminate the catalyst and adversely affect the alkylation reaction. By contacting liquid aluminum chloride-ether catalyst in the catalyst saturator at a temperature higher than that employed in the alkylation reactor, a greater amount of aluminum chloride goes into solution in the liquid catalyst. It can be pumped into the alkylation reactor as a liquid which is essentially free of solid aluminum chloride particles. This avoids the erosion and catalyst contamination problem. The catalyst passing from the catalyst saturator 21 is usually substantially saturated with respect to aluminum chloride.

The temperature at which the catalyst saturator operates determines the amount of aluminum chloride contained in the catalyst. The temperature employed in the saturator is higher than the alkylation reaction temperature but is generally below about 250° F. The catalyst tends to decompose more rapidly at temperatures approaching 250° F. and it is preferable to maintain the catalyst saturator temperature no higher than about 150° F. It may be operated at a temperature of 50 to 150° F., for example at a temperature of about 75–100° F. for ethylene alkylation, the particular saturator temperature, of course, being higher than the alkylation reaction temperature. During butylene and/or propylene and/or amylene alkylation somewhat lower saturator temperatures may be employed e.g. 50–80° F., than are used during ethylene alkylation. The operating temperature of the saturator can be varied within the ranges specified so as to maintain optimum alkylate yields and octane number. If alkylate yields fall off, the temperature of contacting in the catalyst saturator can be increased, or if the octane number of the alkylate decreases then the operating temperature of the catalyst saturator can be reduced. If desired, part of the catalyst can be bypassed through valved line 22 to aid in the control of the aluminum chloride content of the catalyst.

Some catalyst (and the aluminum chloride contained therein) may be lost from the process because it is not all recovered or separated from the alkylate. Make-up catalyst can be added to replace it. By adding ether to the catalyst saturator in an amount sufficient to make up for the amount of ether lost from the system, make-up aluminum chloride-ether catalyst can be prepared in the saturator. This eliminates the need for a separate catalyst preparation vessel. The make-up catalyst so produced will have the same activity as the recycled catalyst and this further simplifies operating problems during the alkylation process since it tends to minimize variation in alkylate yield and octane number.

Referring to catalyst settler 26, a lighter layer of hydrocarbons is removed and passed still under pressure by way of line 28 through back pressure regulator 29. The pressure on the hydrocarbon alkylation products is thereby reduced to slightly above atmospheric pressure. This stream is then passed by way of line 31 into flash drum 32. Reduction of the pressure upon the liquid hydrocarbons causes low boiling hydrocarbons such as isobutane, ethylene, ethane, hydrogen, etc. to vaporize by a flashing effect. A cooling effect is obtained by reason of the vaporization. In addition the liquid volume of hydrocarbons is reduced due to vaporization of part of the low boiling constituents. Liquid is removed from flash drum 32 and passed by way of line 33 into settler 34. Due to the reduced volume of liquid hydrocarbons and the reduction in temperature of the liquid hydrocarbons, the amount of aluminum chloride-ether catalyst which is soluble in the liquid hydrocarbons is reduced. A phase separation occurs in settler 34. The amount of aluminum chloride-ether catalyst which is insoluble in the liquid hydrocarbons is passed from settler 34 by way of line 35 into line 20. It is thereby passed into the catalyst saturator and thereafter recycled to the alkylation reactor.

A supernatant layer of the liquid hydrocarbons is withdrawn from settler 34 and passed by way of line 36 into cooling coils 37 within alkylation reactor 17. This chilled hydrocarbon liquid assists in maintaining the desired alkylation temperature of 50–70° F. After passage through cooling coils 37, this stream is passed by way of line 38 into secondary flash drum 39. The heat adsorbed during passage through the cooling coils raises the temperature of the refrigerant liquid thereby causing vaporization of additional amounts of low boiling hydrocarbons in the coils. In flash drum 39 hydrocarbon vapors are removed overhead and passed by way of line 44 to means for recovering isobutane therefrom. The liquid in vessel 39 is passed by way of line 41 into settler 42. Due to the decreased volume of liquid hydrocarbons, an additional amount of aluminum chloride-ether catalyst becomes insoluble in the hydrocarbons. This layer of liquid aluminum chloride-ether catalyst is removed from settler 42 and passed by way of line 43 into line 20. It is thereafter passed through catalyst saturator 21 and then recycled to the alkylation reactor.

Vapors from primary flash drum 32 are removed overhead and passed by way of line 46 into line 44. The vapors in line 44 are then compressed and passed into fractionator 47. Isobutane is fractionated from the other hydrocarbons and hydrogen in tower 47. The isobutane is removed therefrom, passed through drying means not shown, and then passed by way of line 49 for recycling as feed to the alkylation reactor. Any ethylene, ethane and hydrogen is removed overhead and passed by way of line 48 to facilities for the recovery of ethylene therefrom or for use as fuel gas.

Referring to settler 42, the upper liquid hydrocarbon layer consists of the desired alkylate, some isobutane, and a small amount of aluminum chloride-ether catalyst which is soluble in the liquid hydrocarbons. In conventional alkylation processes this liquid hydrocarbon stream is washed with caustic to neutralize the catalyst, and alkylate of the desired boiling range is recovered from the liquid hydrocarbons by fractionation. Since the liquid hydrocarbons in the present operation contain on the order of 0.1 to 1% of aluminum chloride-ether catalyst (the particular amount will depend upon the temperature employed in the previous catalyst settling operation, the catalyst composition, etc.) and since the catalyst cost is an important factor in the economics of the process, it is very advantageous to provide a means for recovering this amount of dissolved catalyst. The catalyst may be recovered from the liquid hydrocarbons by distilling of the hydrocarbons overhead provided the temperature of the hydrocarbons containing dissolved catalyst does not exceed about 200° F. in the facilities used for catalyst recovery. At temperatures above 200° F. the catalyst decomposes more than is desirable. If the liquid hydrocarbons, which consist for the most part of alkylate, contact the dissolved catalyst at temperatures above about 150–175° F. the octane number of the alkylate decreases. To minimize and substantially eliminate the reduction in alkylate octane number, it is preferred to avoid heating the alkylate containing dissolved catalyst to temperatures higher than about 100–110° F. The evaporation of the alkylate from the dissolved catalyst can be effected by distillation at the temperatures indicated hereinabove while employing pressures in the range which permit evaporation of all of the alkylate at such temperatures. For example, a vacuum distillation to remove alkylate overhead may be used. A flashing operation, under superatmospheric pressure or under vacuum conditions, is a very satisfactory technique. In this embodiment a flashing operation is practiced.

The supernatant liquid hydrocarbon layer containing dissolved catalyst is removed from settler 42 and pumped through line 51 into heater 52. The liquid is therein heated to a temperature of about 100–125° F. It is then passed by line 53 into flash drum 54 wherein all of the alkylate and hydrocarbons are flashed off as vapor but the catalyst is not vaporized. The amount of heat added in heater 52 and the pressure at which flashing is effected are regulated so as to vaporize all of the hydrocarbons in flash drum 54 without vaporizing the catalyst. The temperature in flash drum 54 is maintained at approximately 100–125° F. The liquid stream of hydrocarbons containing dissolved catalyst should also be retained within the specified temperature limits within heater 52 and line 53. It is desirable to maintain as low a temperature as is possible within the heater, line 53 and flash drum 54 while still effecting vaporization of the hydrocarbons and removal of hydrocarbons overhead from flash drum 54. Essentially all of the alkylate is vaporized in flash drum 54, since if liquid alkylate is allowed to collect in flash drum 54 it will contain some dissolved catalyst which will be lost from the system when non-vaporized alkylate is recovered. In addition the collection of non-vaporized alkylate together with non-vaporized catalyst within flash drum 58 will result in a lowering of the octane number of the collected alkylate because of its prolonged contact with the catalyst.

A typical operation in conjunction with an ethylene alkylation operation is to heat the hydrocarbon stream containing dissolved and entrained catalyst in line 51 to about 100–110° F. and effect flashing at a pressure of 0–25 p.s.i.a. and a temperature of approximately 100–110° F. Essentially all of the alkylate passes overhead and its octane number is not reduced to any noticeable extent during the operation. When recovering dissolved and entrained catalyst from butylene or amylene alkylate, similar temperatures are used, but the absolute pressure in the distillation or flashing zone is usually lower. The flashing or distillation may be carried out in the presence of an inert diluent gas such as isobutane, n-butane, nitrogen or the like which has the effect of lowering the partial pressure of the alkylate and enabling it to be volatilized at lower than usual temperatures. The catalyst collects as a liquid pool in the bottom of flash drum 54 and is passed by way of line 56 into line 20 by which it is recycled through the catalyst saturator and then into the alkylation reactor. This flashing technique enables recovery of essentially all of the dissolved catalyst from the hydrocarbon stream. The hydrocarbon vapors removed overhead will not contain any catalyst, or at most only up to 20 p.p.m. of catalyst. Since the hydrocarbon stream to the flashing operation initially contained on the order of 0.1 to 1% of catalyst it is apparent that a substantial savings in the alkylation process is effected by reason of the recovery of all of the dissolved catalyst from the alkylate.

The hydrocarbons removed overhead from flash drum 54 are passed by way of line 57 through a compressor and cooler whereby they are liquified and then introduced into settler 58. Aqueous caustic solution from an outside source is passed by way of line 59 into line 57. The aqueous caustic solution, which is passed with the hydrocarbons through a jet mixer in line 57, is used to neutralize the remaining tract amounts of catalyst, H$_2$S and other impurities that might be present in the hydrocarbons. Caustic solution is removed from settler 58 by way of line 61 and may be recycled in part by way of line 62 to line 57 for reuse, or it may be discarded from the system in whole or in part. The hydrocarbons from settler 58 are removed and passed through line 63, water is added thereto by way of line 64, the water and hydrocarbons are intimately mixed in a jet mixer, and then the mixture is passed into settler 66. Wash water is removed from settler 66 and discarded by way of line 67 to the sewer. A hydrocarbon stream is removed from settler 66 and passed by way of line 68 into fractionator 69. A stream rich in isobutane is removed overhead from fractionator 69. It is condensed, by means not shown herein, and passed by way of line 71 into line 49 by which it is recycled to the alkylation reaction zone. A bottoms stream is removed from deisobutanizer 69 and passed by way of line 72 into fractionator 73. Butane is removed overhead from this fractionator and passed by way of line 74 to storage. A bottoms stream of C$_5$+ alkylate having an octane number on the order of 102–103.5 Research clear is removed from fractionator 73 and passed by way of line 76 to storage from which it is thereafter withdrawn for blending purposes to make high octane gasoline.

The results of carrying out comparative alkylation runs in which hydrogen was employed in one run and was not employed in the other run are presented below. In these runs freshly prepared aluminum chloride ether catalyst was used. The catalysts contained equal volumes of dimethyl ether and diethyl ether and contained in excess of one mol of aluminum chloride per mol of ether. Ether and technical grade AlCl$_3$ granules were agitated at 80–140° F. for a few hours and then the supernatant liquid catalysts were withdrawn and used in the runs. Continuous alkylation runs were carried out employing the following alkylation conditions: temperature of about 50° F., isobutane to ethylene ratio of 10:1, reaction time of approximately 20 minutes, a volumetric ratio of liquid hydrocarbons to catalyst of approximately 20:1. In the continuous runs which were carried out for many hours, the reaction products from the alkylation reactor were settled to separate the catalyst therefrom, and the catalyst was passed through a catalyst saturator and returned to the alkylation reactor. The alkylate was recovered from the liquid hydrocarbons in the settler and was then stabilized. The alkylate yield in terms of weight percent based on ethylene and the octane number of the stabilized alkylate were determined. Small portions of catalyst were withdrawn from the settler from time to time and the amount of aluminum chloride-hydrocarbon complex contained in the catalyst was determined by hydrolyzing the withdrawn portion of catalyst to spring the red oil as a supernatant oily liquid which for the purposes of analyses was assumed to be one third of the complex. The above determinations of what was occurring during the alkylation runs were made at various time intervals during the runs. The results are shown in the following table.

Table I

|  | Run No. 1 | | | Run No. 2 | |
| --- | --- | --- | --- | --- | --- |
| Hours on stream | 31 | 70 | 100 | 31 | 70 |
| Hydrogen added, mol percent on olefin | 10 | 10 | 5 | 5 | none |
| Alkylation yield [1] | 265 | 275 | 290 | 265 | 210 |
| Octane No. Res. Clear | 103.0 | 103.2 | 102.2 | 102.6 | 102.0 |
| AlCl$_3$—HC complex in catalyst, wt. percent | 3.9 | 4.5 | 4.2 | 33.6 | 40.8 |

[1] Wt. percent on ethylene charge.

In the alkylation run in which hydrogen was added along with the feed to the alkylation reactor (run No. 1) the alkylate yield after 70 hours on stream was 275% by weight based on ethylene and the octane number of the alkylate was 103.2 Research clear. The catalyst contained only 4.5% by weight of aluminum chloride-hydrocarbon complex. On the other hand, in the run in which no hydrogen was added the yield had dropped down to 210% by weight and the octane number had dropped to 102.0 Research clear. The aluminum chloride-hydrocarbon complex was present in the catalyst sample withdrawn to the extent of 40 percent by weight. The yield continued dropping in this run and the run was terminated before 100 hours. In the run in which hydrogen was employed, even after 100 hours the yield was 290% by weight, the octane number was 102.2 Research clear, and the aluminum chloride-hydrocarbon complex was present in the catalyst only to the extent of 4.2% by weight. Thus the use of hydrogen held up alkylate yields, octane number, suppressed aluminum chloride-hydrocarbon complex formation, and enabled longer runs to be made with the catalyst.

While the invention has been described in connection with an isobutane-ethylene alkylation system, it obviously may be employed in practicing the alkylation of other isoparaffins such as isopentane, isohexane, isoheptane, etc. with other olefins such as propylene, butenes, amylenes, etc. Although the invention has been illustrated by means of certain embodiments and examples other embodiments and techniques which are equivalents thereof will be obvious to those skilled in the art.

Thus having described the invention what is claimed is:

1. In an alkylation process wherein isoparaffins and olefins in the liquid state are commingled with a liquid catalyst consisting of aluminum chloride and low molecular weight aliphatic ether in a mole ratio of AlCl$_3$ to said ether is excess of 1 under alkylation reaction conditions to form isoparaffin-olefin alkylate, and in which alkylation process an aluminum chloride-hydrocarbon complex is formed in said commingling zone, the improvement which comprises effecting the commingling in the presence of hydrogen in an amount of from .01 to about 1 mole per mole of olefin present in said commingling zone.

2. The process of claim 1 wherein the olefin is ethylene.

3. In an alkylation process wherein isobutane and ethylene are introduced into an alkylation reaction zone and are therein commingled in the liquid state with a liquid catalyst consisting of aluminum chloride and low molecular weight aliphatic ether in a mole ratio of $AlCl_3$ to said ether from 1.01 to about 1.5 under alkylation reaction conditions to form gasoline boiling range alkylate and wherein an aluminum chloride-hydrocarbon complex is formed during the alkylation reaction, the improvement which comprises introducing hydrogen into the alkylation reaction zone in an amount between about .05 to 0.5 mols per mol of ethylene introduced into the alkylation reaction zone.

4. The process of claim 2 wherein hydrogen is introduced into the alkylation reaction zone in an amount between about .1 to .25 mols per mol of ethylene introduced into the alkylation reaction zone.

References Cited in the file of this patent

UNITED STATES PATENTS

| | | |
|---|---|---|
| 2,318,781 | Ipatieff et al. | May 11, 1943 |
| 2,361,368 | Evering et al. | Oct. 31, 1944 |
| 2,368,653 | Francis | Feb. 6, 1945 |
| 2,443,606 | d'Ouville et al. | June 22, 1948 |
| 2,477,290 | Dornte et al. | July 26, 1949 |
| 2,803,684 | Frey et al. | Aug. 20, 1957 |